United States Patent
Dasgupta et al.

(10) Patent No.: US 10,592,544 B1
(45) Date of Patent: Mar. 17, 2020

(54) GENERATION OF PROCESS MODELS IN DOMAINS WITH UNSTRUCTURED DATA

(71) Applicant: Live Objects, Inc., Palo Alto, CA (US)

(72) Inventors: Sudipto Shankar Dasgupta, Sunnyvale, CA (US); Kamesh Raghavendra, Bangalore (IN)

(73) Assignee: LIVE OBJECTS, INC., Palo Alto, CA (US)

( * ) Notice: Subject to any disclaimer, the term of this patent is extended or adjusted under 35 U.S.C. 154(b) by 0 days.

(21) Appl. No.: 16/540,530

(22) Filed: Aug. 14, 2019

(30) Foreign Application Priority Data

Feb. 12, 2019 (IN) .............................. 201941005513

(51) Int. Cl.
| | |
|---|---|
| *G06F 16/35* | (2019.01) |
| *G06N 5/02* | (2006.01) |
| *G06N 3/04* | (2006.01) |
| *G06F 16/31* | (2019.01) |
| *G06N 3/08* | (2006.01) |

(52) U.S. Cl.
CPC .......... *G06F 16/353* (2019.01); *G06F 16/316* (2019.01); *G06N 3/0427* (2013.01); *G06N 3/0445* (2013.01); *G06N 3/0454* (2013.01); *G06N 3/08* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 5,182,794 | A | 1/1993 | Gasperi et al. |
| 5,890,133 | A | 3/1999 | Ernst |
| 6,763,353 | B2 | 7/2004 | Li et al. |
| 7,120,896 | B2 | 10/2006 | Budhiraja et al. |
| 7,162,458 | B1 | 1/2007 | Flanagan et al. |
| 8,036,907 | B2 | 10/2011 | Davies et al. |
| 8,166,013 | B2 | 4/2012 | Bandaru et al. |
| 9,176,951 | B2 * | 11/2015 | Patrudu .................... G06N 5/02 |

(Continued)

OTHER PUBLICATIONS

Agrawal, R. et al., "Mining Process Models from Workflow Logs," International Conference on Extending Database Technology, Jan. 22, 1998, pp. 1-21.

(Continued)

*Primary Examiner* — Alan Chen
(74) *Attorney, Agent, or Firm* — Fenwick & West LLP

(57) ABSTRACT

A computing server configured to process data of a domain from heterogeneous data sources. A domain may store data and schema, domain knowledge ontology such as resource description framework, and unstructured data. The computing server may extract objects from the unstructured data. The computing server may convert the extracted named entities and activities to word embeddings and input the word embeddings to a machine learning model to generate an activity time sequence. The machine learning model may be a long short-term memory. A process model may be generated from the time sequence. The computing server may identify outliers in the process model based on metrics defined by the domain. The computing server may convert transactions without outliers as word embeddings and generate signatures of the transactions using cosine similarity. The computing server may augment the results with the domain knowledge ontology.

18 Claims, 12 Drawing Sheets

(56) References Cited

U.S. PATENT DOCUMENTS

| | | | |
|---|---|---|---|
| 2004/0210552 | A1 | 10/2004 | Friedman et al. |
| 2016/0140236 | A1* | 5/2016 | Estes ................ G06N 5/022 707/709 |
| 2017/0109657 | A1* | 4/2017 | Marcu ............... G06F 11/3672 |
| 2018/0032861 | A1* | 2/2018 | Oliner ............... G06N 3/0445 |
| 2018/0146000 | A1* | 5/2018 | Muddu ............. H04L 63/1425 |
| 2018/0219889 | A1* | 8/2018 | Oliner .................. G06N 3/08 |
| 2018/0322283 | A1* | 11/2018 | Puri .................. G06F 21/554 |

OTHER PUBLICATIONS

Chen, D. et al.,"A Fast and Accurate Dependency Parser using Neural Networks," Proceedings of the 2014 Conference on Empirical Methods in Natural Language Processing (EMNLP), Oct. 25-29, 2014, pp. 740-750, Doha, Qatar.

Explosion AI, "Architecture: Library architecture," undated, three pages, May be Retrieved at<URL:https://spacy.io/api/>.

Hochreiter, S. et al., "Long Short-Term Memory," Neural Computation, Nov. 15, 1997, pp. 1735-1780, vol. 9, Issue 8.

Kiperwasser, E. et al., "Simple and Accurate Dependency Parsing Using Bidirectional LSTM Feature Representations," Transactions of the Association for Computational Linguistics, Jul. 2016. pp. 313-327, vol. 4.

Lafferty, J. et al., "Conditional Random Fields: Probabilistic Models for Segmenting and Labeling Sequence Data," Proceedings of the 18$^{th}$ International Conference on Machine Learning, Jun. 28, 2001, pp. 282-289.

Lipton, Z. et al., "A Critical Review of Recurrent Neural Networks for Sequence Learning," arXiv preprint arXiv:1506.00019, Jun. 5, 2015, 38 pages.

Miller, E. "An introduction to the Resource Description Framework." Bulletin of the American Society for Information Science, Oct./Nov. 1998, pp. 15-19.

Pennington, J. et al., "Glove: Global Vectors for Word Representation," Proceedings of the 2014 Conference on Empirical Methods in Natural Language Processing (EMNLP), Oct. 25-29, 2014, pp. 1532-1543, Doha, Qatar.

Rubin, V., et al., "Process Mining Framework for Software Processes." International Conference on Software Process, May 2007, 21 pages.

Rubin, V., et al., "Process Mining Framework for Software Processes," undated, 12 pages, May be Retrieved at<URL:http://www.processmining.org/_media/publications/wvdaalst_p401.pdf>.

Steinbach, M. et al., "A Comparison of Document Clustering Techniques," KDD Workshop on Text Mining, Aug. 20-23, 2000, 20 pages.

Van Der Aalst, W. et al., "ProM: The Process Mining Toolkit." Proceedings of the Business Process Management Demonstration Track (BPMDemos 2009). Sep. 8, 2009, 49 pages, Ulm, Germany.

* cited by examiner

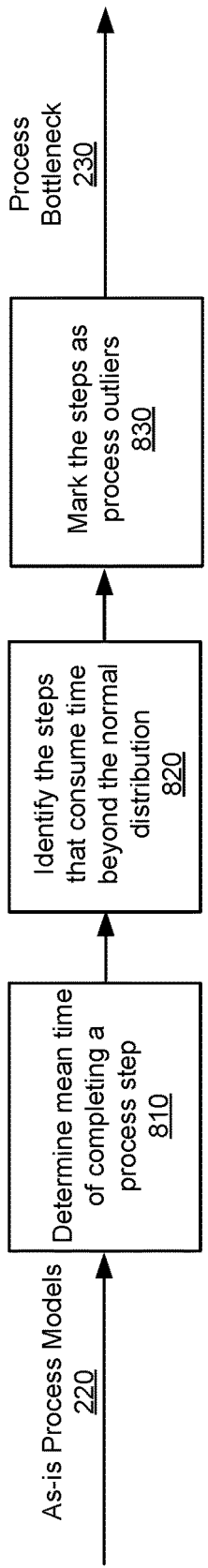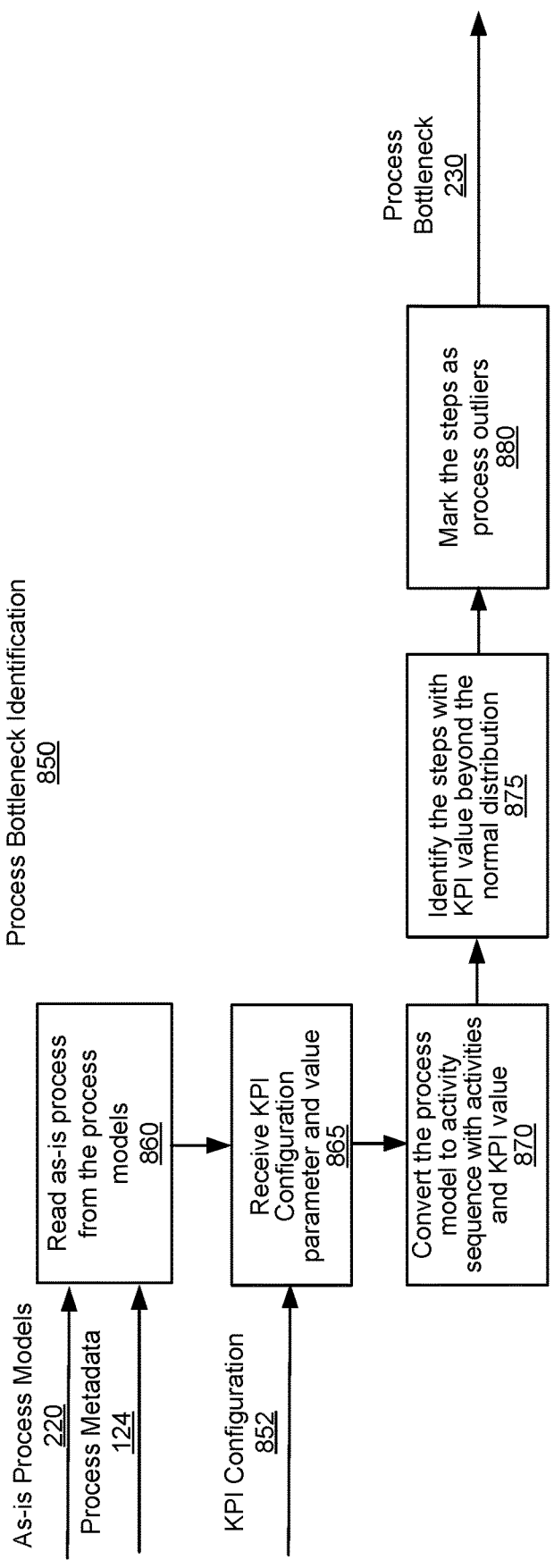
FIG. 8A
FIG. 8B

GENERATION OF PROCESS MODELS IN DOMAINS WITH UNSTRUCTURED DATA

CROSS-REFERENCE TO RELATED APPLICATION

The present application claims the benefit of Indian Provisional Patent Application 201941005513, filed on Feb. 12, 2019, which is hereby incorporated by reference in its entirety.

TECHNICAL FIELD

The present disclosure generally relates to automatic extraction of data from a domain, and more specifically, to data mining systems for heterogeneous data sources present in a domain.

BACKGROUND

Various domains are often associated with their own data structure, data sources, and ontology definitions related to the data and other aspects. A domain may include heterogenous data such as unstructured data that may include text, files, and documents stored in various computers and structured data that may be defined by various schemas in one or more databases. It is challenging to process a large amount of data that could be distributed among various heterogenous sources that are not easily identified and managed. Conventional techniques available for processing text and documents involve labor intensive data generation techniques such as manual identification and categorization of objects and attributes in the text and documents.

The conversion of unstructured files and documents to structured data that is organized in a manner easily accessible by a domain may often be too costly to perform consistently to capture all potential changes in unstructured files. For example, a domain may generate a large number of documents and files every second. Conventionally, while the existence or creation of those files may be captured by the domain, information included in the unstructured documents and files may contain important data that are not often automatically converted to a format that is easily accessible from a database. Also, even if some of the information is converted to structured data, data from various sources is often not sufficiently linked to provide meaningful insights regarding the domain.

SUMMARY

Disclosed herein relates to automatic extraction of objects stored in unstructured data sources that could include text in natural language and other documents saved in a distributed fashion. A computing system may retrieve and analyze data schemas in a domain and train a machine learning model to identify the types of objects of interest. Objects identified in various unstructured sources may be converted to other representations such as embedding vectors in a multi-dimensional space that represent the objects' relationships among other data in the domain. Sequences of objects and events may be generated from the embedding vectors using a neural network such as long short-term memory to connect data and objects from various sources. A consolidated model representing a process of the domain may be constructed. The computing server may identify outliers in the model and optimize the model based on signature of transactions generated using techniques such as cosine similarity.

By way of example, in one embodiment, a computing server may receive a master data schema of a domain and a transaction data schema of the domain. The computing server may identify named entities in unstructured data of the domain based on the master data schema and the transaction data schema. At least one of the identified named entity corresponds to values stored in the master data schema or the transaction data schema. The computing server may identify activities associated with the named entities. At least one of the identified activities may be extracted from the unstructured data. The computing server may label the activities with timestamps to generate an activity time sequence that arranges labeled activities in accordance with the timestamps. The computing server may generate one or more event sequences related to a target process associated with the domain. At least one of the event sequences may be generated from the activity time sequence. The computing server may combine the plurality of event sequences to generate a process model representing the target process. The process model may include data representing a directed and branched graph. At least a branch in the graph may correspond to the at least one of the event sequences generated from the activity time sequence. The computing server may identify a bottleneck in the target process based on the data representing the directed and branched graph.

BRIEF DESCRIPTION OF THE DRAWINGS

FIGS. 8A and 8B are block diagrams illustrating example process bottleneck identification stages, in accordance with various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
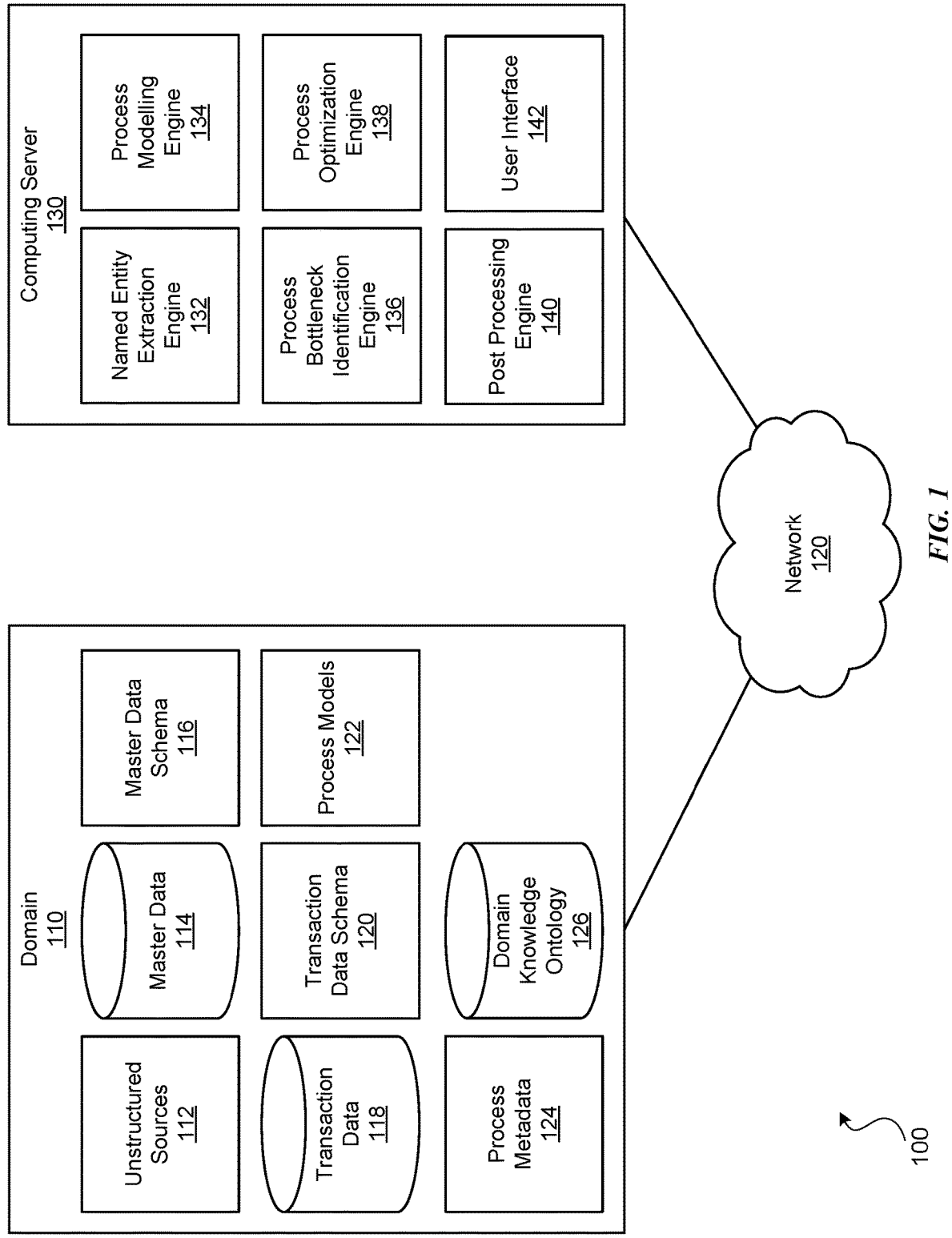
FIG. 1 is a block diagram illustrating an example system environment, in accordance with an embodiment.

Referring now to Figure (FIG. 1, shown is a block diagram illustrating an embodiment of an example system environment 100 for extracting process events and generating process models from a domain 110, in accordance with an embodiment. The system environment 100 may include a domain 110, a network 120, and a computing server 130. In various embodiments, the system environment 100 may include fewer or additional components. The system environment 100 also may include different components.

A domain 110 may be an environment in which a system operates and/or an environment of a group of units and individuals that use common domain knowledge to organize activities, information and entities related to the domain in a specific way. An example of a domain 110 may be an organization, such as a business, an institute, or a subpart thereof. A domain 110 may be associated with a specific domain knowledge ontology, which could include representations, naming, definitions of categories, properties, and relationships among various concepts, data, and entities that are related to the domain 110. For example, a first domain may be a first organization that has its own definitions of terms and criteria on what a specific task is considered completed, while a second domain, which could be a different organization, may have different sets of definitions of terms and different sets of tasks and entities that are related to the second domain. In some embodiments, a single organization may be associated with multiple domains. For example, each department of the organization may have different definitions, internal procedures, tasks, and entities. In other embodiments, multiple organizations may share the same domain.

The computing server 130 may include one or more computing devices that cooperate to perform various tasks related to the domain 110 such as extracting events occurred in the domain 110, generating process models from extracted events, identifying bottlenecks in various processes, and optimizing the processes associated with the domain 110. The computing server 130 may be a distributed computing system. The computing server 130 may provide the analysis and process generation tasks to the domain 110 as a form of cloud-based software, such as software as a service (SaaS), through the network 120. For example, the computing server 130 may retrieve various information such as data, metadata and schemas via suitable communication channels of the domain 110 such as through the domain's application program interface (API). The computing server 130 may perform calculations and analysis of the retrieved data and present the results through a graphical interface. Alternatively, or additionally, to the SaaS, the computing server 130 may also perform the tasks as a form on on-premise software.

The network 120 provides connections to the components of the system environment 100 through one or more sub-networks, which may include any combination of local area and/or wide area networks, using both wired and/or wireless communication systems. In one embodiment, a network 120 uses standard communications technologies and/or protocols. For example, a network 120 may include communication links using technologies such as Ethernet, 802.11, worldwide interoperability for microwave access (Wi-MAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML), extensible markup language (XML), JavaScript object notation (JSON), structured query language (SQL). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet. In some cases, the computing server 130 may belong to a part of the internal computing system of the domain 110. In such cases, the network 120 may be a local network that enables the computing server 130 to communicate with the rest of the components of the domain 110.

Referring to the domain 110, it includes various data and ontology that defines its knowledge and nomenclature. The domain 110 may include unstructured sources 112, master data 114, master data schema 116, transaction data 118, transaction data schema 120, organization process models 122, organization process metadata 124, and domain knowledge ontology 126. In various embodiments, the domain 110 may include fewer or additional components. The domain 110 also may include different components.

Unstructured sources 112 includes various data sources that store information and data that are generated throughout the course of operations of the domain 110. Unstructured data often does not have a pre-defined data structure and may include a large amount of text. For example, unstructured data may include information that is in natural languages such as the text in emails. An email server that stores the emails of the domain's employees may be an example of an unstructured source 112. Other examples of unstructured sources 112 may include documents and files stored in different computers of the domain 110, chat logs, PDF documents, word documents, text documents, scanned document images, etc. Unstructured data may also include other information that is not entirely in natural languages such as call logs, machine logs (bot logs), process logs, etc. The different unstructured sources 112 and other structured sources may represent heterogenous data sources of the domain 110.

Master data 114 may include information of relevant entities and objects in the domain 110. For example, master data 114 may describe parties, locations, and other objects around which the domain's businesses and events are conducted. The things that are recorded in the master data 114 may include customers, products, employees, assets, materials, suppliers, vendors, geographical locations, sites, etc. Master data 114 may be saved in a structured manner such as SQL, another relational structure, or another suitable data format, which may include key-value pairs. For example, master data 114 may take the form of identifiers that may uniquely associate a named entity or another object of the domain 110 with a data entry. Master data 114 may also include extended attributes that describe the qualities and other characteristics about the named entities or other objects. An example entry of master data 114 for an employee of the domain 110 may include a unique identifier that takes the form of a hash or a uniform resource identifier (URI) as a primary key, a type identifier that identifies the entry as an entry for employees, metadata associated with the entry, name of the employee, and various values that describe characteristics such as email address, address, date of employment, etc. of the employee. The example entry of master data 114 may also include other child entries such as keys of other structured entries that are associated with the employee. The child entries may or may not be master data 114. For example, the entry may include the keys of master data entries of customers to describe the relationships between the employee and the customers. The entry also may include the keys of transaction data entries to associate the employee with transactions that involve the employee.

The master data schema 116 describes the relationships, structure, and hierarchies of various types of master data 114. For example, the master data schema 116 may take the form of a blueprint that describes the structure of the database of the master data 114. The blueprint may include a collection of schema objects and the connections, structure, and hierarchies of the schema objects. Schema objects may include tables, sequences, synonyms, indexes, clusters, links, procedures, functions, etc. For example, the master data schema 116 may include a table that describe a type of master data entries (e.g., employee entries), the primary key and foreign keys allowed to be associated with the type of entries, fields of attributes that are available for the type of entries, and potential connections between fields and other types of entries. For example, an example connection between a field and another type of entry may indicate that a particular attribute for an entry may be a foreign key that is linked to another table associated with another type of data. Components of the master data schema 116 may include tables, fields, field lengths, field types, field descriptions, foreign key relationships, primary key relationships, etc.

Transaction data 118 may include information about relevant activities and events that occur around the domain 110 such as transactions that are related to the named entities identified in the master data 114. For example, transaction data 118 may include sales, deliveries, invoices, claims, customer service tickets, and other interactions among various entities and objects associated with the domain 110. A transaction may include multiple events. Activities recorded in the transaction data 118 often may be associated with timestamps, although such timing information may be absent for some records. Transaction data 118 similarly may be saved in a structured manner such as SQL, another relational structure, or another data formats, which may include key-value pairs. For example, an example entry of transaction data 118 for a manufacture transaction of the domain 110 may include a unique identifier that takes the form of a hash or a URI as the primary key, a type identifier that identifies the type of transaction (e.g., the type is a manufacture sequence), metadata associated with the entry, objects and entities associated with the manufacture transaction (e.g., product codes, material identifiers, etc.), and timestamps for the key events in the transactions (time for raw material received, time for item completion, etc.).

In general, master data 114 may be associated with objects or entities of the domain 110 while transaction data 118 may be associated with temporal events occurring around those objects and entities.

Similar to master data schema 116, transaction data schema 120 describes the relationships, structure, and hierarchies of various types of transaction data 118. For example, the transaction data schema 120 may take the form of a blueprint that describes the structure of the database of the transaction data 118. The blueprint may include a collection of schema objects and the connections, structure, and hierarchies of the schema objects. Components of the transaction data schema 120 may include tables, fields, field lengths, field types, field descriptions, foreign key relationships, primary key relationships, etc.

The process models 122 may include data regarding various process models associated with the domain 110. For example, in a sales transaction, an example process model as defined by the domain 110 may be a sequence of event that includes a confirmation of the order, a receipt of the payment, a retrieval of items from a warehouse, a shipment of the items, a confirmation of delivery of the items, and the close of the sales transaction. In another example, in a manufacture transaction, an example process as defined by the domain 110 may include a reception of parts, storage of the parts, the creation of intermediate components, different stages of manufacturing, the packaging of the finished products, and storage of the products in a warehouse.

The domain 110 may initially create various process models 122 based on the practices of the organization associated with the domain 110. The domain 110 may receive refined or improved process models 122 based on suggestions of process variants transmitted from the computing server 130 after the computing server 130 analyzes the process models 122 in manners that will be discussed in further details in association with FIGS. 6-10. The process models 122 also may be edited manually by humans or machines. The process metadata 124 stores metadata regarding the process models 122 such as the time of creation or modification of a process model, the author of a process model, changes in a process model, etc.

The domain knowledge ontology 126 may include data that represent knowledge, concepts, and the relationships among concepts that may be specific to the domain 110. Domain knowledge ontology 126 may include policies, rules, and relationship definitions. For example, the ontology for a business domain may describe known business rules dependent or independent of a particular business context. Domain knowledge ontology 126 may be represented by data in resource description framework (RDF) and/or web ontology language. Domain knowledge ontology 126 may include classes and relationships as the main components. A class may represent a concept such as a rule or a policy, an entity, and other objects in the domain 110. A relationship may describe the connection between two classes. An example piece of domain knowledge may be that shipment orders that start with the letter "I" are denoted as international shipment orders for a particular domain 110. Such a rule or practice may be captured in the ontology.

In one embodiment, the domain knowledge ontology 126 may be represented by data in an extensible markup language format such as RDF. The RDF format may be expressed as resource, property type, and property value triplets. The domain knowledge ontology 126 may represent an object (e.g., an entity, an item, a facility, a store) as a resource that is uniquely identifiable by a URI. The object in the form of a resource may be associated with different attributes that can be identified as property types. Each attribute value may be expressed as the property value. In other words, property types express the relationship of values associated with resources. A value may take the form of a text string or numbers that could be atomic in nature, of another value that is divisible, or of another resource. A description of a resource may be a collection of the relationships among different property types and values associated with the resource, which is linked to other resources through property value. Some of the resources in the domain knowledge ontology 126 may be entries of master data 114. The property types of some resources in the domain knowledge ontology 126 may be entries of master data 114 and entries of transaction data 118. For example, an entry of the domain knowledge ontology 126 may specify, within the domain 110, a store ABC (a resource) has a store manager (property type) who is John Smith (property value, also a resource), which is express as a triplet. John Smith in turns has other different property types such as email address (atomic text strings), employee identifier (number), supervisees (other resources), returns approved by the store manager (transaction data), etc. that can be expressed by other triplets. The entries for the store ABC, John Smith and his supervisees may be named entities that are stored as a part of the master data 114. The returns records approved by John Smith may be stored as a part of transaction data 118. The ontology also may map similar business entities and store parent-child relationships between business entities.

In one embodiment, the domain knowledge ontology 126 may impose a syntax requirement such as a formal structure that is compatible to XML and may allow users to define semantics using various customizable namespace conventions designed by the users. The domain knowledge ontology 126 also may be associated with a schema that defines the relationship between different property types, types of resources, available property types for a particular kind of resources, etc. Miller, Eric, "An introduction to the resource description framework," Bulletin of the American Society for Information Science and Technology 25.1 (1998): 15-19 is incorporated by reference for all purposes.

Referring to computing server 130, it includes various components that perform analysis of transactions occurred around the domain 110. The computing server 130 may include named entity extraction engine 132, process modeling engine 134, process bottleneck identification engine 136, process optimization engine 138, post processing engine 140, and user interface 142. In various embodiments, the computing server 130 may include fewer or additional components. The computing server 130 also may include different components. The functions of the computing server 130 may be distributed among the components in a different manner than described. Each engine in the computing server 130 may include software algorithms that work with hardware as described in FIG. 11.

The named entity extraction engine 132 may extract named entities from various documents and files of the domain 110 such as from the unstructured sources 112. A named entity may be an object that is related to the domain 110, such as a person, a location, an organization, an item, an electronic product, etc. The named entity extraction engine 132 may automatically extract named entities from unstructured sources 132 to identify events that occur around the extracted named entities. For example, the named entity extraction engine 132 may retrieve the master data schema 116 and the transaction data schema 120 of the domain 110. Based on the master data schema 116 and the transaction data schema 120, the named entity extraction engine 132 may identify types of named entities in unstructured data 112 that need to be extracted. The unstructured data 112 may include text that provides context of the activities occurred around the extracted entities. The named entity extraction engine 132 may identify those activities. The named entity extraction process will be discussed in more details in association with FIGS. 3 and 4.

The process modeling engine 134 may perform process mining to generate one or more event sequences related to a target process associated with the domain 110. An event sequence may include one or more events that are labeled with timestamps and are arranged in accordance with the timestamps. In a process mining, event sequences may be constructed through various sources, including the unstructured sources 112, the master data 114, and the transaction data 118. A process model may combine multiple similar transactions (e.g. sales transactions of the same type of products to a different customer, productions of the same items by different manufacturing plants). Although the transactions included may be similar, a process model may include branches that indicate variations in those transactions. Each transaction may include one or more event sequences that are extracted from unstructured sources 112 and transaction data 118. A process model may include data representing a directed and branched graph. At least a branch in the graph corresponds to one of the event sequences extracted from the domain 110. The process modeling will be discussed in more details in association with FIGS. 5-7.

The process bottleneck identification engine 136 may identify one or more bottlenecks in a target process that is generated. The process bottleneck identification engine 136 identifies outliers in a process model. What constitutes an outlier may be defined by the users of the domain 110. For example, the process bottleneck identification engine 136 may use key performance indexes (KPIs) to measure a process model that includes an outlier. The KPIs may be user defined and may be time, cost, labor, and other metrics that measure the quality of one or more steps in the process model. An outlier may be a step in the process model that is statistically outside the norm of average processes. For example, same or otherwise comparable steps of various transactions may be modeled using a Gaussian distribution. The transactions that include steps having the KPIs that are beyond a certain number of standard deviation (e.g., 3 standard deviations) may be labeled as outliers. The process bottleneck identification will be discussed in more details in association with FIGS. 8A and 8B.

The process optimization engine 138 may provide suggestions to refine and improve existing as-is process models. For example, the process optimization engine 138, using results of the process bottleneck identification engine 136, may identify satisfactory transactions such as those without outliers. The process optimization engine 138 constructs a process variant based on the identified satisfactory transactions and provides the suggested process variant to the domain 110 to improve the process models in the domain 110. The process optimization engine 138 also may receive manual refinement and reinforcement from users of the domain 110 in improving the suggested process variants. The process optimization will be discussed in more details in association with FIG. 9.

The post-processing engine 140 may perform post processing of the results that are generated by process modeling and process optimization. Post processing may include enriching the generated results with domain knowledge ontology 126, refining the generated process variants based on manual inputs, and updating the domain 110 with new process models that are based on the process variants. The post processing will be discussed in more details in association with FIG. 10.

The user interface 142 may provide an interface to transmit and display results and measurements generated from the analysis performed by the computing server 130. The user interface 142 may take different forms. In one embodiment, the user interface 142 may be an application interface that is provided and controlled by the computing server 130. For example, the computing server 130 may provide the results of its analysis through cloud-based SaaS. The user interface 142 may be a front-end software application that can be installed, run, and/or displayed at a client device for users of the domain 110. The user interface 142 also may take the form of a webpage interface of the computing server 130 to allow clients to access data and results through web browsers. The user interface 142 may include a graphical user interface (GUI) that displays various results and data analyzed by the computing server 130, such as an identified bottleneck of a process and a suggest process variant. In another embodiment, the user interface 142 may not include graphical elements but may provide other ways to communicate with the domain 110, such as application program interfaces (APIs).

Figure 2:
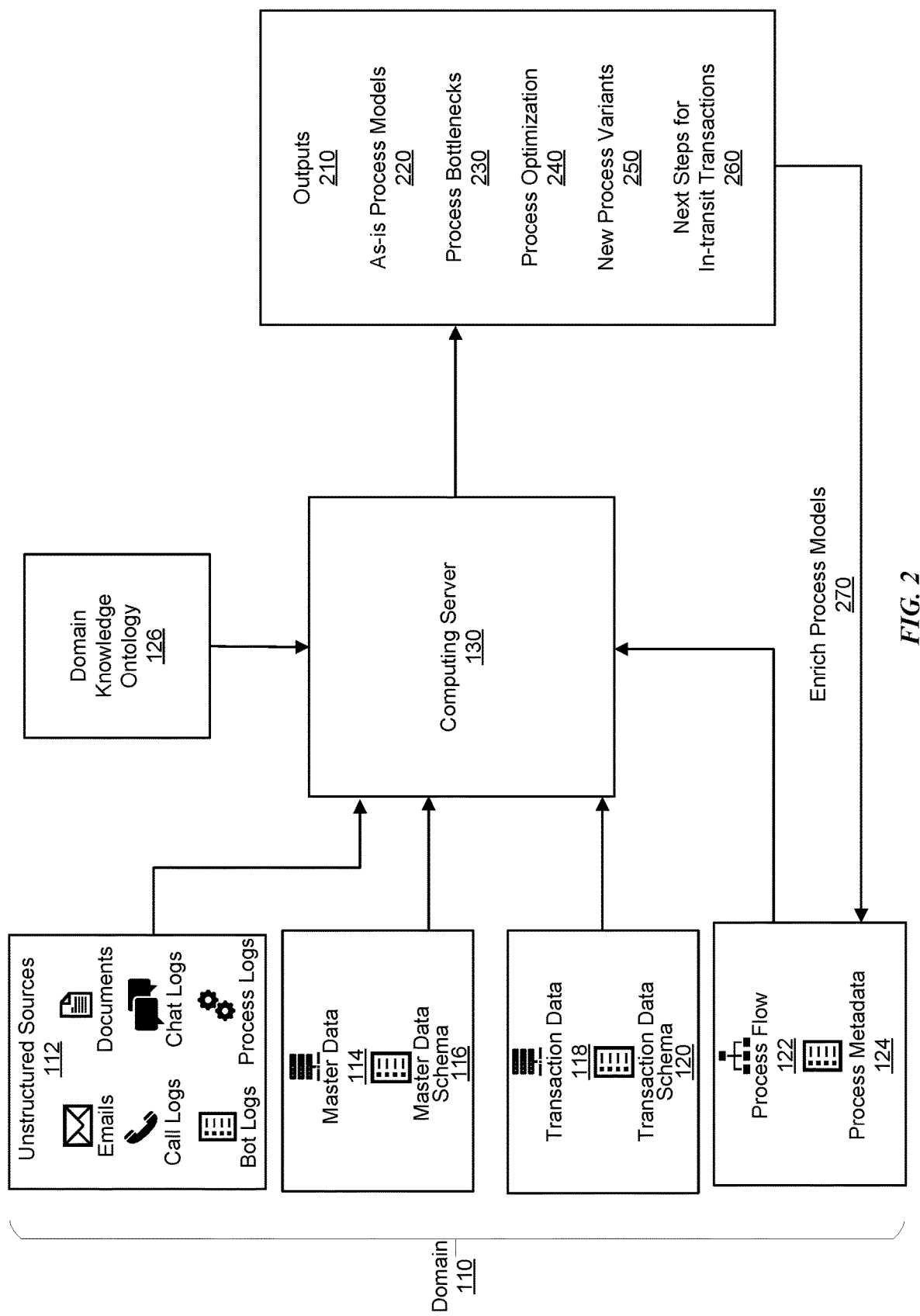
FIG. 2 is a block diagram illustrating example inputs and outputs of a computing server, in accordance with an embodiment.

FIG. 2 is a block diagram illustrating example inputs and outputs for the computing server 130, in accordance with an embodiment. The computing server 130 may communicate with the domain 110 through one or more communication channels, cloud synchronization, and/or APIs. The computing server 130 may receive different data from the domain 110, including data from unstructured sources 112, master data 114, master data schema 116, transaction data 118, transaction data schema 120, process models 122, process metadata 124, and domain knowledge ontology 126. The input domain knowledge ontology 126 may be in an RDF format. Using different data extract techniques and analyses, the computing server 130 generates outputs 210 that are related to the processes that occur around the domain 110. The outputs 210 may include different types, including as-is process models 220, process bottlenecks 230, process optimization results 240, new process variants 250 and next steps predictions 260 for some of the in-transit transactions. The outputs 210 are transmitted to the domain 110 to update the process models 122 to enrich the process models 122 that are stored and currently used in the domain 110, as indicated by the arrow 270. The outputs 210 may also receive human or machine feedbacks before the process models 122 are updated at the domain 110.

The outputs 210 includes as-is process models 220, which may be process models that are constructed from sequences of actual events occurred at the domain 110. The as-is process models 220 may represent processes that are observed in the domain 110 without alternation or optimization performed by the computing server 130. The process bottlenecks 230 are bottlenecks identified by the computing server 130 based on potential outliers identified in various process models. The new process variants 250 are process flows that incorporate the process optimization results 240 to improve upon the as-is process models 220. In-transit transactions may include transactions that are still in progress. The next steps 260 for in-transit transactions are predicted next steps that are generated by the computing server 130 after analyzing the as-is process models 220 that are related to the in-transit transactions.

Example Process Model Generation Flow

Figure 3:
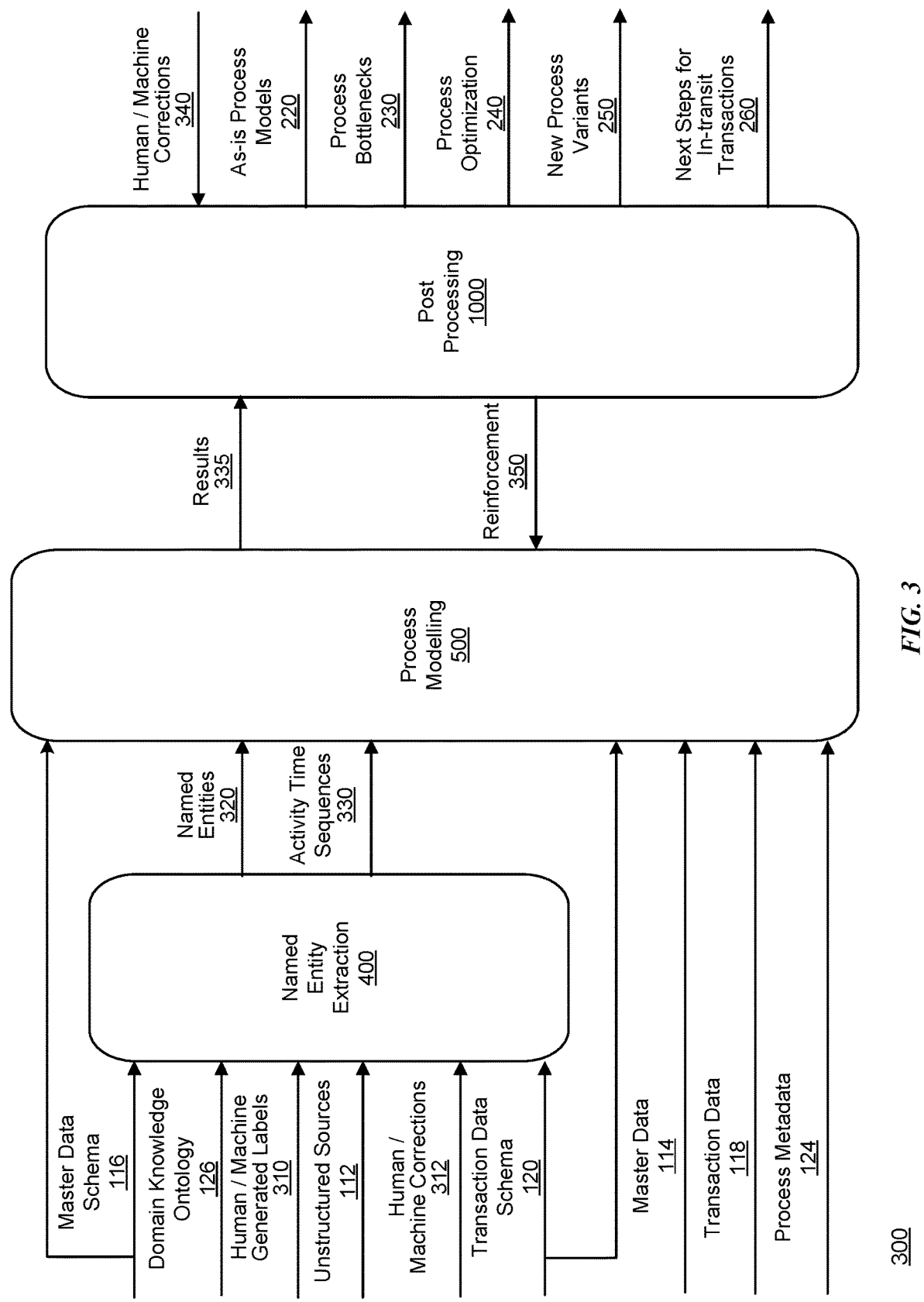
FIG. 3 is a block diagram illustrating an example flow to generate a process model from data of a domain, in accordance with an embodiment.

FIG. 3 is a block diagram illustrating an example flow 300 to generate a process model from data of a domain 110, in accordance with an embodiment. The example flow 300 may be performed by various components of the computing server 130. The example flow 300 may include a named entity extraction stage 400, a process modeling stage 500, and a post processing stage 1000. A flow in accordance with other embodiments may include different, fewer or additional stages.

In the named entity extraction stage 400, the computing server 130 extracts named entities and activities related to those entities from unstructured sources 112. An activity may be an instance of the occurrence of a particular event around the domain 110. Events, such as orders, payments, deliveries, etc., may be categories of various activities. For example, the activity recorded in a data log representing "the bar code of item #1234 scanned at the admission of warehouse A" may be an example of an instance of occurrence of the event "start of storage at warehouse." Another activity recorded in an email stating "I put item #2342 at warehouse B at 5 p.m." may be another example of an instance of the occurrence of the event "start of storage at warehouse."

During the named entity extraction stage 400, the computing server 130 also may label activities with timestamps to generate one or more activity time sequences that occur around the named entities as appeared in the unstructured sources 112. To generate the outputs of the named entity extraction stage 400, the computing server 130 may rely on data such as master data schema 116, domain knowledge ontology 126, human/machine generated labels 310, human/machine corrections 312, and transaction schema 120. The human/machine generated labels 310 may be labels that are manually added to objects that appear in unstructured sources 112. For example, a user may specify that a person as a customer and label the person's name stored in a database as a customer. The human/machine corrections 312 may correct named entity or events automatically identified. For example, a user may correct the label of an employee (a named entity) that is misidentified as a customer.

In the named entity extraction stage 400, the computing server 130 may retrieve the master data schema 116 and the transaction data schema 120 of the domain 110. Based on the master data schema 116 and the transaction data schema 120, the computing server 130 identifies named entities in unstructured data of the domain 110 to generate named entities 320. The computing server 130 also may identify activities associated with the named entities as appeared in the unstructured sources 112 and generate one or more activity time sequences 330 based on the extraction of information from the unstructured sources 310.

In the process modeling stage 500, the computing server 130 receives the results from the named entity extraction stage 400, including extracted named entities 320 and extracted activity time sequences 330. The computing server 130 generates results 335, which may include as-is process models, bottlenecks, process optimization results. The computing server 130 also may rely on master data 114, master data schema 116, transaction data 118, transaction data schema 120, and process metadata 124 to generate the results 335. In the process modeling stage 500, the results 335 may include as-is process models 220, to identify process bottlenecks 230, to suggest process optimizations 240, to generate new process variants 250, and to predict next steps 260 for in-transit transactions.

In the post-processing 1000, the computing server 130 further enriches the results 335 generated in the process modeling stage 500. The refinement includes reading human/machine correction 340 that manually corrects errors in the results 335, such as errors in the generated process models. The computing server 130 may also augment the extracted events and generated process models with domain knowledge ontology 126. The improved results are fed back to the process model stage 500 to reinforce 350 the algorithm and machine learning models used in the process model stage 500. The computing server 130 also provides the domain 110 with the new process variants 250 to update the process models 122 stored.

Example Named Entity Extraction

Figure 4:
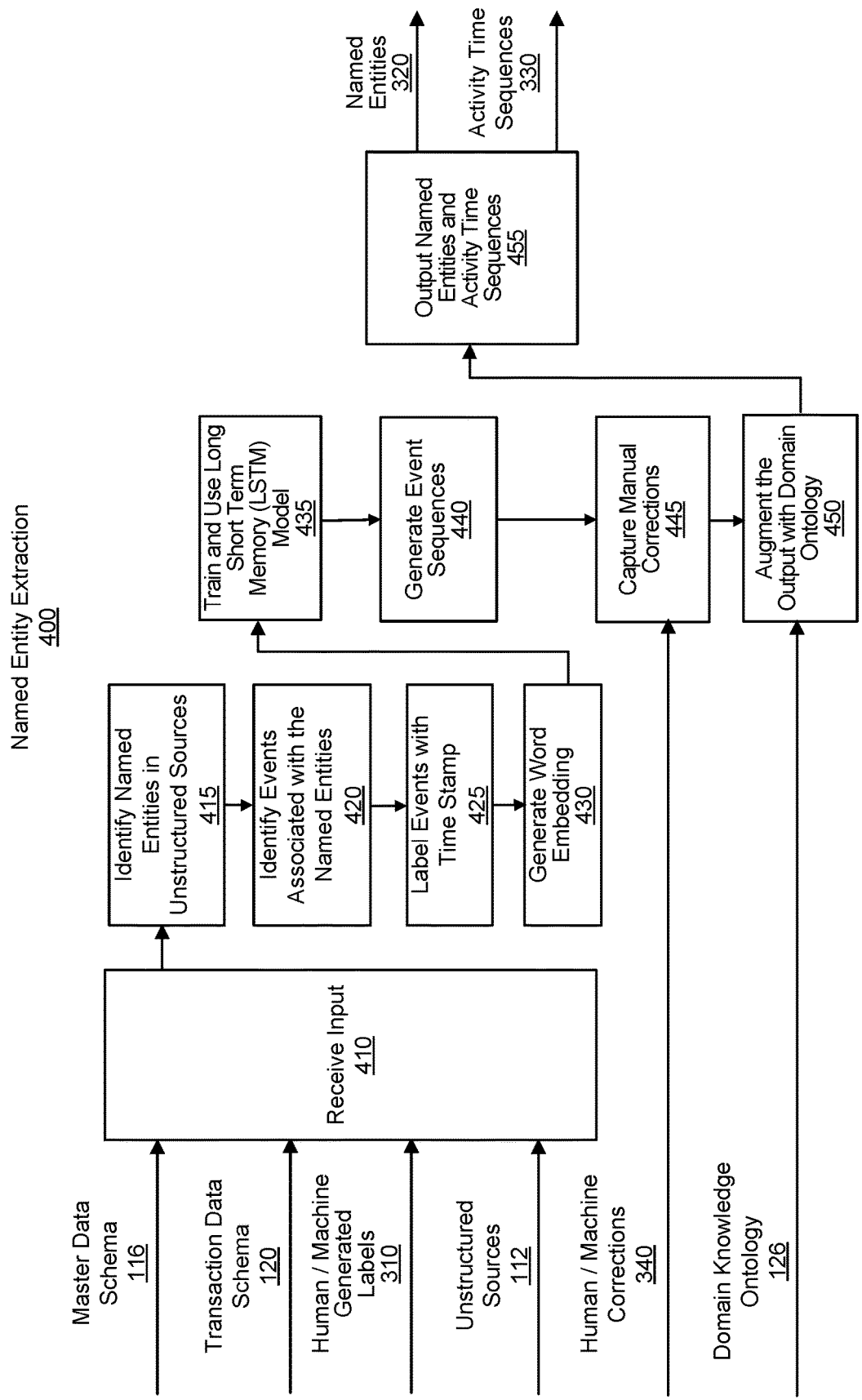
FIG. 4 is a flowchart illustrating an example named entity extraction stage, in accordance with an embodiment.

FIG. 4 is a flowchart illustrating an example named entity extraction stage 400, in accordance with an embodiment. In this stage 400, the computing server 130 may generate a list of activities that happened in the domain 110 and determine when those activities happened. The computing server 130 may extract named entities from unstructured sources 112 and identify activities occurred around the named entities as indicated by various documents from the unstructured sources 112. The computing server 130 also may automatically extract relevant time information from unstructured sources 112 and label extracted activities with timestamps. Based on the identified activities, the computing server 130 generates one or more activity time sequences.

By way of example, the computing server 130 receives 410 inputs of various types from the domain 110. The inputs may include master data schema 116, transaction data schema 120, human/machine generated labels 310, and unstructured data from unstructured sources 112. In one embodiment, the master data schema 116 may be read from the master data system of the domain 110 using Java Database Connectivity (JDBC) and/or representational state transfer (REST) API based connectors. For example, the computer server 130 may make a request to the API system of the domain 110 for a URI that is associated with the master data schema 116. In response, the domain 110 transmits a payload that is formatted in XML or JSON with key-value pairs that include the data representing the master data schema 116. Data received by the computing server 130 may include master data tables, fields, field lengths, field types, field descriptions, foreign key relationships, primary key relationships, etc. The computing server 130 may also retrieve transactional data schema 120 in a similar manner using an API. The computing server 130 also downloads unstructured data from the domain 110 and retrieves human/machine generated labels 310.

The computing server 130 identifies 415 named entities in unstructured data 112 of the domain 110 based on the master data schema 116 and the transaction data schema 120. In one embodiment, the identification of named entity may include two steps. First, the computing server 130 determines the types of named entities needed to be extracted. Second, the computing server 130 identifies named entities that fit the types in the unstructured sources 112. In determining the types of named entities needed to be extracted, the computing server 130 may rely on the master data schema 116 and the transaction data schema 120. For example, at least some of the types of named entities may correspond to values in the master data schema 116 or the transaction data schema 120. The values may be present in the tables, fields, field descriptions, available foreign keys, available primary keys as described in the data of the master data schema 116 or the transaction data schema 120.

Based on the master data schema 116 and the transaction data schema 120 specific to a domain 110, the types of named entities needed to be extracted may be specific to the particular domain 110. The computing server 130 may train one or more machine learning models to identify the types of named entities that are important to improving target processes of a particular domain 110. For example, for a domain 110 that focuses on retail business, the transaction data schema 120 may indicate that transactions that are related to sales of items to customers are an important process of the domain 110. The machine learning models may identify sales related named entities, such as salespersons, customers, stores, store locations, retail items, etc., to be extracted from unstructured sources. In a second domain for a software development company that aims to improve its delays in developing software applications, the machine learning models may identify research and development related named entities, such as engineers, executives, key deadlines, software features, etc., to be extracted from unstructured sources. For the second example domain, retail related named entities, such as salespersons or customer service representatives, may not be needed to be extracted. The types of named entities that need to be extracted may also be based on human/machine generated labels 310. For example, a user may specifically provide a type of named entity that the computing server 130 needs to extract. After determining the types of named entities to be extracted, the computing server 130 uses named entity recognition techniques to extract named entities from unstructured data such as text in emails and other documents stored in the computing server 130.

Based on the name entities identified, the computing server 130 also identifies 420 activities that are associated with the named entities. The computing server 130 may first identify the type of activities that are relevant to the target processes based on the nature of the target processes, the human/machine generated labels 310, and the transaction data schema 118. One or more machine learning models may be trained to identify relevant types of activities to be extracted for certain target processes. The computing server 130 may extract activities from the unstructured sources 112 such as by analyzing the context of emails and documents and by extracting activities from process logs. The computing server 130 also extract timing information associated with the activities. The computing server 130 labels 425 the activities with timestamps that are generated based on the timing information. Activities that are labeled with timestamps may be referred to as labeled activities.

For each target process associated with the domain 110, the computing server 130 generates one or more activity time sequences 330 related to the target process. An activity time sequence includes one or more labeled activities arranged in accordance with the timestamps. The generation of an activity time sequence may include multiple steps. In one embodiment, the computing server 130 may generate 430 word embeddings on the named entities extracted. A word embedding may be a vector in an n-dimensional space that represents the semantic relationships of the named entities relative to other words presented in the text of the unstructured source 112. In a natural language sentence, "Peter purchased a refrigerator model #123 at Santa Monica store" may be labeled with various label values by named entities recognition as "[Peter]$_{customer}$ purchased a [refrigerator]$_{item}$ model [#123]$_{model\_num}$ at [Santa Monica store]$_{store\_ID}$." In generating the vector, the computing server 130 relies on the named entities extracted, label values, text content, label position in the text content. The corpus in generating the word embeddings includes documents of the organization and documents from the domain 110. Pennington, Jeffrey, Richard S ocher, and Christopher Manning, "Glove: Global vectors for word representation," Proceedings of the 2014 Conference on Empirical Methods in Natural Language Processing (EMNLP), 2014 is hereby incorporated by reference for all purposes.

The identified named entities' embeddings along with other embeddings may be input into a classifier that assigns labels to different identified named entities based on the contextual information represented by the embeddings. For example, in generating one or more activity time sequences 330, the computing server 130 may train and use 435 a recurrent neural network such as a long short-term memory (LSTM). An LSTM is a neural network that has feedback connections in one or more neurons. The architecture of the LSTM may include cells, regulators such as input gates, output gates, and forget gates. Hochreiter, Sepp, and Jürgen Schmidhuber. "Long short-term memory," Neural Computation 9.8 (1997): 1735-1780 is hereby incorporated by reference for all purposes. In one embodiment, the LSTM receives non-sequence word embedding vectors as inputs and generate activity time sequences as outputs. An activity time event sequence includes one or more labeled activities arranged in accordance with the timestamps. In training the LSTM, known activity time sequences and known named entities represented by word embeddings may be used as training sets. Techniques such as coordinate descent, backward propagation, forward propagation are used to determine the gradient and adjust the weight factors of the neurons in the LSTM to reduce the errors for the LSTM in reconstructing the known activity time sequences based on the input word embeddings in the training sets.

After the LSTM is trained, the computing server 130 may generate 440 activity time sequences. The computing server 130 also may receive manual corrections such as human/machine corrections 340 that are input to the computing server 130. The computing server 130 captures 445 the manual corrections to adjust the output activity time sequences and correct any discrepancies with the output activity time sequences. The computing server 130 also may receive the domain knowledge ontology 126 from the domain 110. The computing server 130 may enrich the output activity time sequences based on the domain knowledge ontology 126.

For example, the domain knowledge ontology 126 may be used to resolve ambiguity in the activity time sequence and supplement other information absent from the activity time sequence. In one case example, a generated activity time sequence may include a shipment number that starts with the letter "I." The domain knowledge ontology 126 may include information that a shipment number starting with the letter "I" refers to an international shipment. The shipment being international initially may not be captured in the generated activity time sequence. The computing server 130 may augment the activity time sequence based on this piece of knowledge. In another case example, the domain knowledge ontology 126 may include information that a retail store receives all products from a particular warehouse. The event sequence may not capture the warehouse but the information may be augmented to the activity time sequence based on the domain knowledge ontology 126. The computing server 130 outputs 455 both the named entities 320 and the activity time sequences 330 to process modeling.

Example Process Modeling

Figure 5:
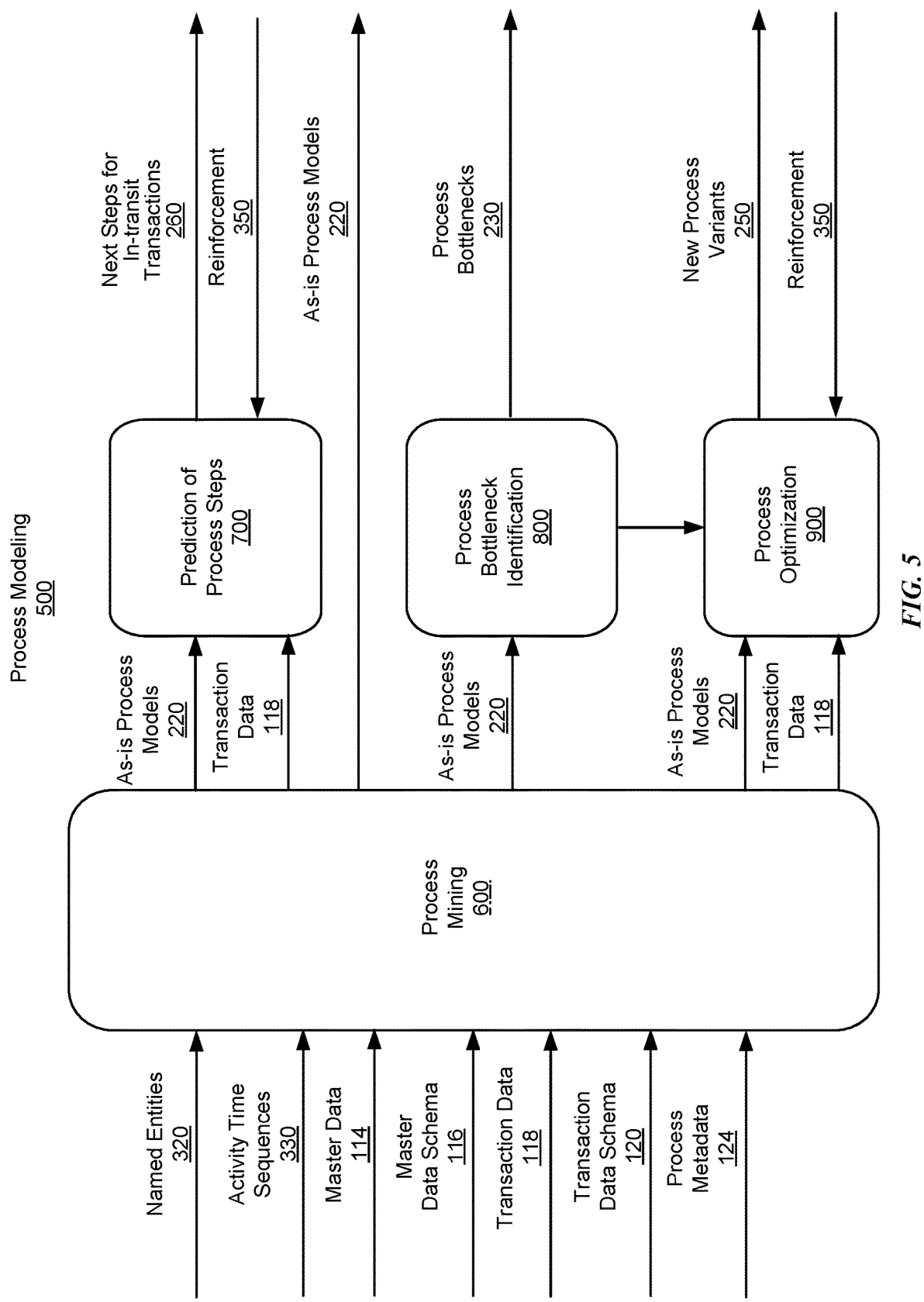
FIG. 5 is a block diagram illustrating an example process modeling flow, in accordance with an embodiment.

FIG. 5 is a block diagram illustrating an example process modeling flow, in accordance with an embodiment. The processing modeling 500 may include multiple stages such as process mining 600, prediction of process steps 700, process bottleneck identification 800, and process optimization 900. Other embodiments of process modeling 500 may include different, fewer, or additional stages.

The process mining 600 may take inputs from the named entity extraction 400 including the extracted named entities 320 and the activity time sequences 330. The process mining 600 also may receive data from the domain 110 such as master data 114, master data schema 116, transaction data 118, transaction data schema 120, and process metadata 124. The process mining 600 converts the inputs into as-is process models 220 by combining a plurality of event sequences to generate a process model representing a target process. The process model may include data representing a directed and branched graph. The as-is process models 220 may be one of the types of outputs generated in process modeling 500.

The computing server 130 may perform other tasks of process modeling including prediction of process steps 700, process bottleneck identification 800, and process optimization 900. In the prediction of process steps 700, the computing server 130 may use the as-is process models 220 and the transaction data 118 to generate predicted next steps 260 for in-transit transactions. After confirmation the actual next steps in the in-transit transactions, the computing server 130 may receive reinforcement data 350 to verify whether the prediction is correct. The computing server 130 may adjust the prediction model based on the reinforcement data 350.

The computing server 350 also may identify bottlenecks based on one or more KPIs that define outliers in various as-is process models 220. Using the identified bottlenecks, the as-is process models 220, and the transaction data, the computing server 130 may also perform process optimization 900 to generate one or more suggested new process variants 250 that improve the as-is process models 220. The process optimization 900 may also be reinforced 350 by manual correction, domain knowledge ontology 126, and other labels and process data collected. The new process variants 250 are transmitted to the domain 110.

Example Process Mining

Figure 6A:
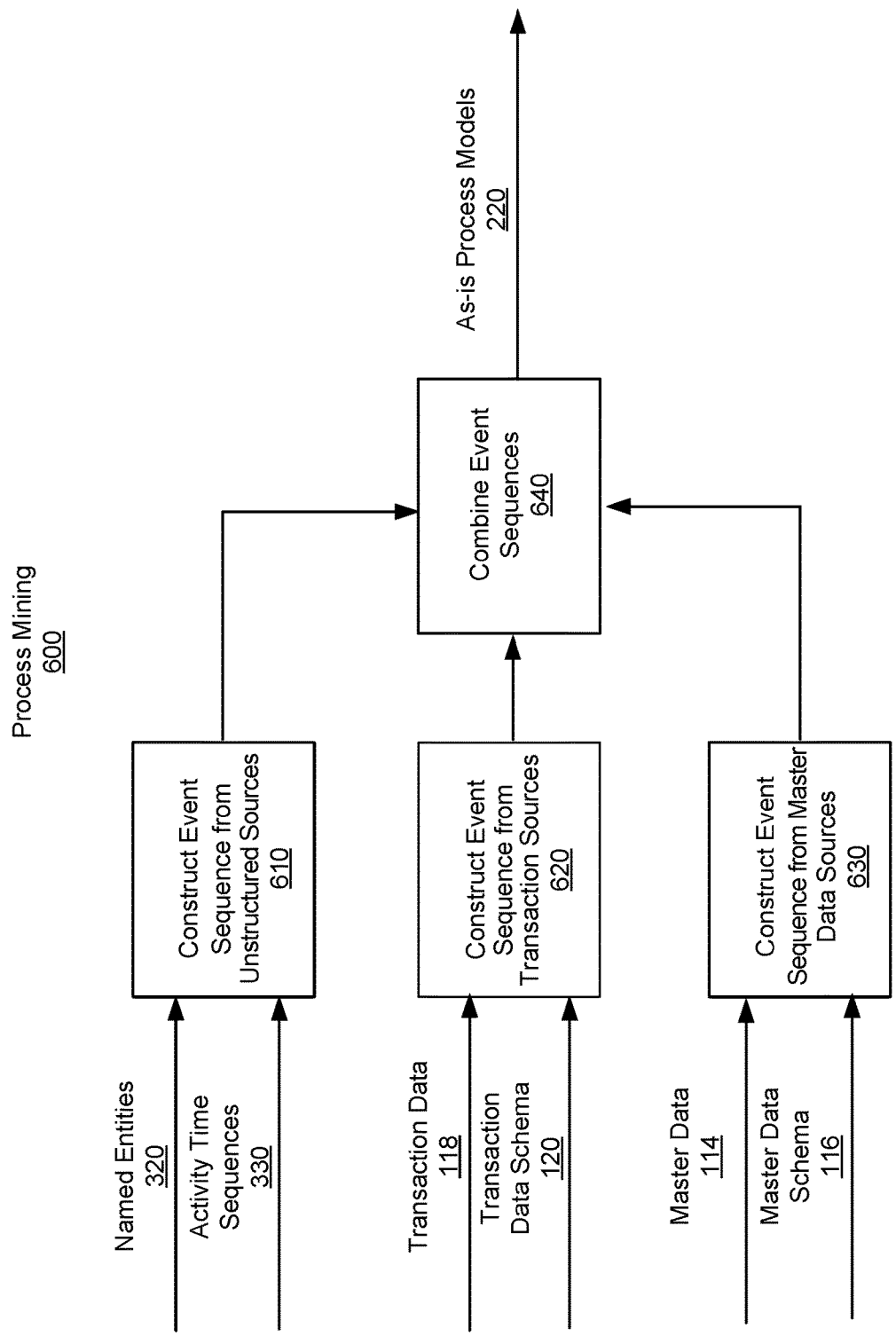
FIG. 6A is a block diagram illustrating an example flow of process mining, in accordance with an embodiment.

FIG. 6A is a block diagram illustrating an example flow of process mining 600, in accordance with an embodiment. The computing server 130 generates one or more event sequences related to a target process associated with the domain 110 from various sources. The event sequences may be generated from activity time sequences 330 and from other sources such as master data 116 and transaction data 118. The computing server 130 may rely on the master data 114 and the transaction data 116 to determine relationships of the extracted named entities 320 and activity time sequences 330 to generate and combine event sequences.

By way of example, the computing server 130 may construct 610 event sequences from unstructured sources based on extracted named entities 320 and the activity time sequences 330. A target process model may involve different named entities 320 performing different tasks or participating in different activities. For example, similar orders, shipments, and deliveries of a domain 110 may be extracted from various unstructured sources 112. Each instance of those orders, shipments, or deliveries that is specific to certain named entities may be an activity. The computing server 130 may classify similar activities to the same event. For example, a first customer may purchase an item on a day and a second customer may purchase the same item on a second day. The two purchases may be two instances of activities, but may be classified as the same event "purchase of item X" or simply "purchase," depending on the granularity of how the computing server 130 defines an event. Different transactions may be associated with corresponding individual activity time sequences 330 but may belong to the same event sequence for a target process model. For example, the manufacture of the same product items may be carried by a domain 110 in different batches. A first batch of manufacture may be represented as a first transaction that is associated with a first activity time sequence 330 while a second batch may be represented as a second transaction that is associated with a second activity time sequence 330. Each activity time sequence 330 may have the same order or different orders of events even though the transactions are similar. The computing server 130 may convert the activities to events and generate event sequences from activity time sequences 330.

The computing server 130 also may construct 620 other event sequences from transaction sources that include transaction data 118 and transaction data schema 120. For example, the transaction data schema 120 may provide important information regarding the relationships, connections, and orders of events that are stored in transaction data 118. The computing server 130 may extract activities or events stored in transaction data 118 and generate event sequences based on timing information stored in the transaction data 118 and the relationship data stored in the transaction data schema 120. Similarly, the computing server 130 further may construct 630 additional event sequences from master data sources including master data 114 and master data schema 116.

The computing server 130 may combine 640 the plurality of event sequences to generate a process model representing the target process. For example, the computing server 130 may use an algorithm such as the Alpha algorithm to construct the orders, causalities, and relationships among the plurality of event sequences. The computing server 130 also may construct place-transition net from event logs. A process model may combine similar historical event sequences and include branches of different variations of the process.

By way of example, in combining 640 a plurality of event sequences, the computing server 130 may identify a plurality of events presented in various event sequences. Some events are common among various event sequences while others are unique. The computing server 130 may determine the transition relationships among different events. Possible transition relationships may include causal (e.g., event A preceding event B), parallel (both event A occurs before event B and event B occurs before event A are observed), unrelated (there is no observation of event B occurs after event A), etc. The computing server 130 also may identify possible initial events and end events in a target process model. The computing server 130 also may determine causality between a first subset of events and a second subset of events. At least some of the events among a subset may be parallel or unrelated.

Figure 6B:
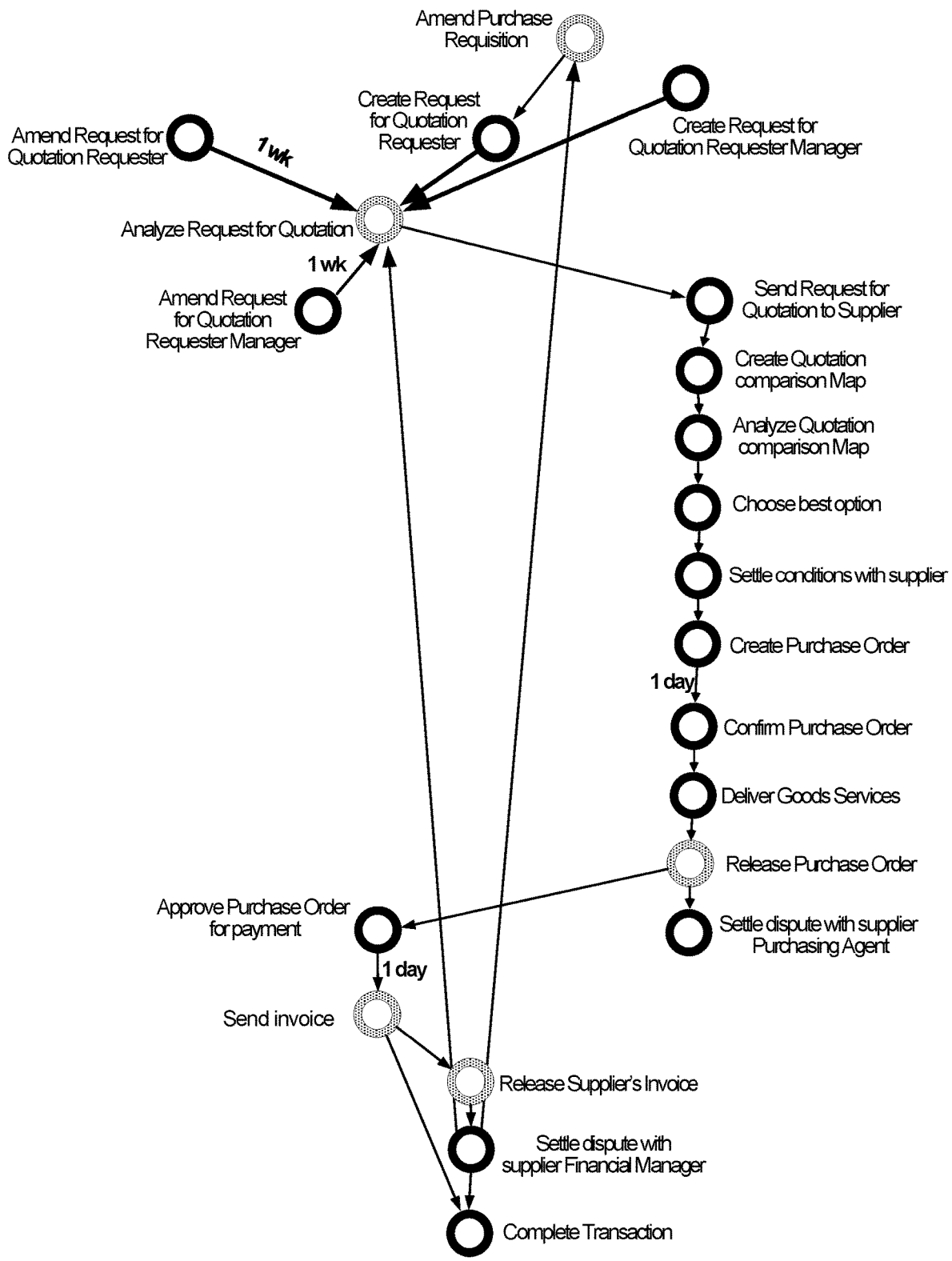
FIG. 6B is a block diagram illustrating an example process model, in accordance with an embodiment.

Based on the subsets, causality, parallelism, and unrelatedness, the computing server 130 combines a plurality of event sequences to generate a consolidated event sequence. The consolidated event sequence may be a directed and branched graph. In one embodiment, at least a branch in the graph corresponds to one of the event sequences that is generated from an activity time sequence 330. The consolidated event sequence may serve as the output of the process mining 600, which is the as-is process model 220. The computing server 130 may divide the consolidated event sequence into a plurality of steps. Some of the steps may not have branches while other steps may have a plurality of branches. FIG. 6B is a block diagram illustrating an example of a consolidated event sequence, which may be a process model in accordance with an embodiment. Each circle in FIG. 6B may represent an event of the process model.

Example Prediction of Process

Figure 7:
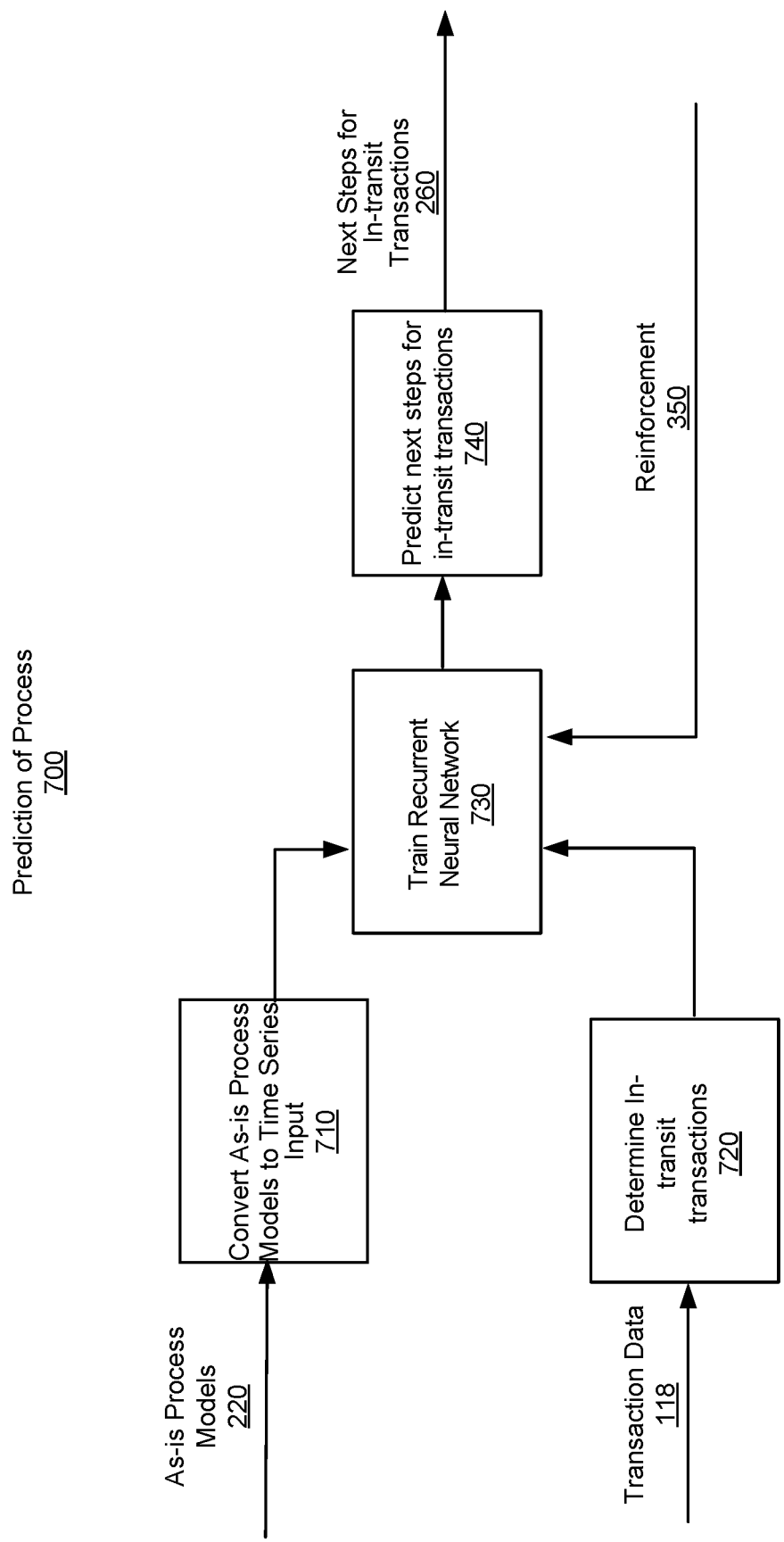
FIG. 7 is a block diagram illustrating an example prediction of process stage, in accordance with an embodiment.

FIG. 7 is a block diagram illustrating an example prediction of process stage 700, in accordance with an embodiment. The computing server 130 generates as-is process models 220 from process mining 600. The computing server 130 may convert 710 as-is process models 220 to time series inputs. A converted as-is process model 220, such as in the format of a time series input, or an unconverted as-is process model 220, may be referred to a version of the process models. Time series may be a sequence of data points in successive order. The computing server 130 may treat an initial event of the as-is process model as time zero. The computing server 130 may determine features or statistics of various events in the as-is process models 220 and converts the features or statistics to numerical values as time series data. The computing server 130 also may receive transaction data 118 and determine 720 transactions that are still in progress as in-transit transactions.

The computing server 130 may train 730 a recurrent neural network (RNN) to predict next steps for in-transit transactions. For example, the computing server 130 may use historical completed transactions as training sets. The computing server 130 identifies completed transactions that belong to a target as-is process models. The computing server 130 inputs the as-is process models and the activities in the completed transactions to the RNN but withhold some of the final events in the completed transactions in the input. The RNN predicts the events that are withheld and the computing server 130 compare the predicted events to the actual events that occurred in the completed transactions. The computing server 130 may determine the loss function of the RNN in terms of the error in the prediction. The computing server 130 may use techniques such as coordinate descent to adjust the weights of the neurons or activation functions of the neurons to reduce the error of the RNN. The training of the RNN is complete after a predetermined number of rounds of iterations of training (e.g., a predetermined number of epochs) or when the error of the RNN no longer improves (e.g., the RNN has converged).

After the RNN is sufficiently trained, the computing server 130 may use the RNN to predict 740 the next steps for actual in-transit transactions. The result generated is the next steps 260 for in-transit transactions. After the in-transit transactions are completed, feedbacks regarding the correctness of the prediction may be input in the prediction of process stage 700 as reinforcement 350 to further refine the RNN and provide additional training data for the RNN.

Example Bottleneck Identification

FIGS. 8A and 8B are block diagrams illustrating different examples of a bottleneck identification stage, in accordance with an embodiment. The computing server 130 identifies a bottleneck in a target process based on data representing the process models. The computing server 130 receives as-is process models 220. The computing server 130 may divide a process model into a plurality of steps. A step may correspond to a transition from one event to another event or may include transitions of multiple events. For steps that include transitions of multiple events, some steps may include a plurality of branches.

Based on different transactions that are classified as belonging to the target process model, the computing server 130 may determine 810 an average time of completing a step. For steps with branches, the computing server 130 may determine the average time based on the time spent for the branches. The computing server 130 may identify 820 steps that consume time beyond the normal distribution. For example, the computing server 130 may identify steps with time spent that is significantly more than the average as outliers. Outliers may be steps that deviate from the average time for more than a threshold amount. The threshold amount may be a certain number of standard deviations from the average, such as two or three standard deviations. The computing server 130 also may identify one of the branches within a step as an outlier. Transactions that correspond to the branch may be classified as outliers. The computing server 130 may mark 830 those identified steps or branches as process outliers. The outliers may be identified as the bottlenecks of the process model.

In one embodiment, the outliers may be determined based on other performance metrics than time. For example, cost, number of employees involved, revenue, customer experience, composite metrics, or other suitable performance metrics may also be used. In process bottleneck identification stage 850 shown in FIG. 8B, the computing server 130 may read 860 as-is process models 220 and process metadata 124. The computing server 130 also may receive 865 a performance index, such as KPI, from KPI configuration 852. The computing server 130 may convert 870 a target process model to activity sequence with activities and KPI values. Each activity may be assigned with a KPI value.

The computing server 130 determines an average value of KPI based on the KPI values for each activity or each step in the process model. The computing server 130 may identify 875 steps that are associated with KPI values that are significantly more than the average as outliers. Outliers may be steps that deviate from the average KPI value for more than a threshold amount. The threshold amount may be a certain number of standard deviations from the average, such as two or three standard deviations. The computing server 130 also may identify one of the branches within a step as an outlier. Transactions that correspond to the branch may be classified as outliers. The computing server 130 may mark 880 those identified steps or branches as process outliers. The outliers may be identified as the bottlenecks of the process model.

Example Process Optimization

Figure 9:
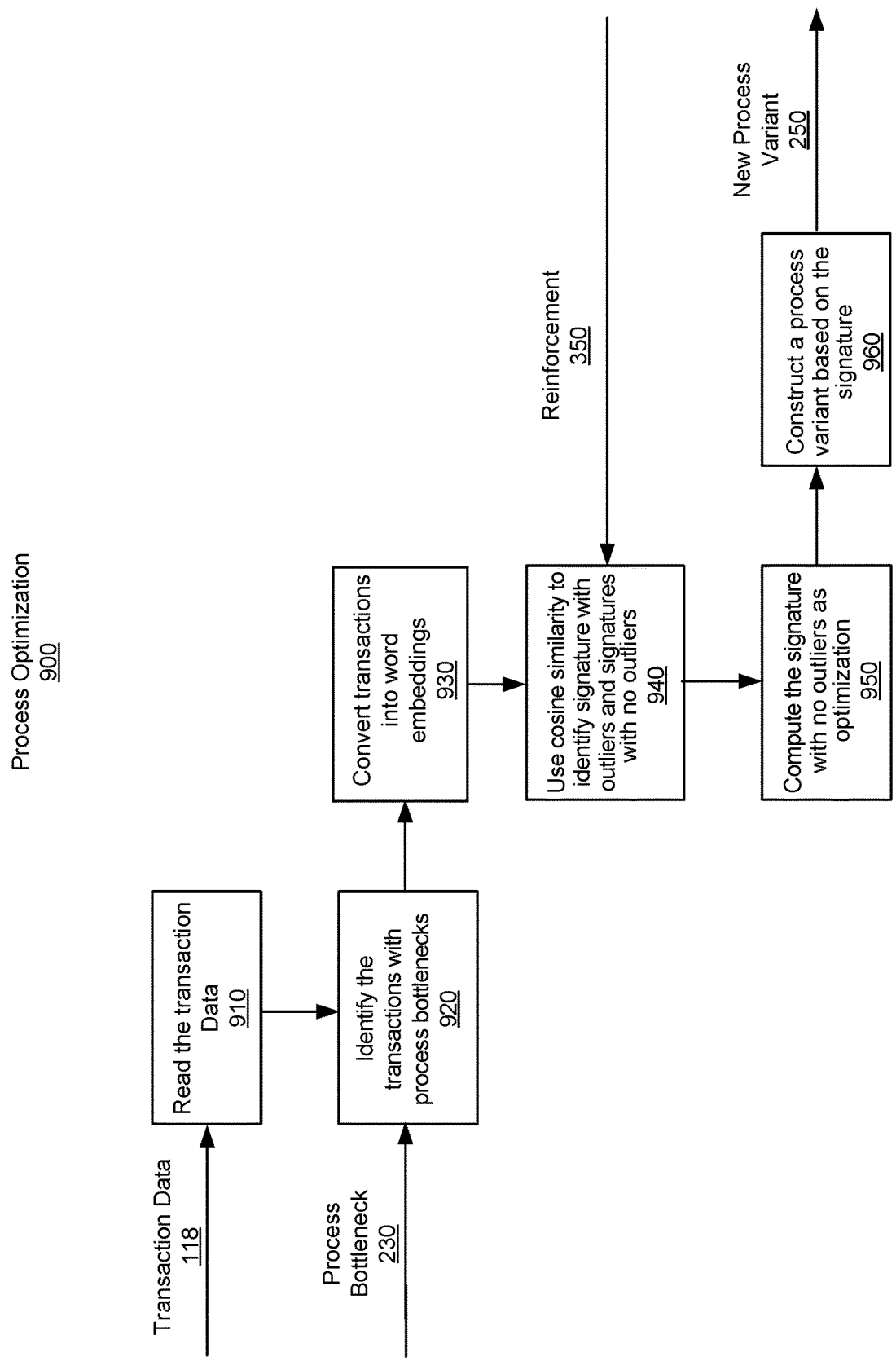
FIG. 9 is a block diagram illustrating an example process optimization stage, in accordance with an embodiment.

FIG. 9 is a block diagram illustrating an example process optimization stage, in accordance with an embodiment. The computing server 130 may read 910 the transaction data 910. In turn, the computing server 130 may identify a plurality of transactions that belong to a target process. A transaction may be associated with one or more event sequences. The computing server 130 also may receive process bottlenecks 230 that are identified in the bottleneck identification stage. The computing server 130 may identify 920 the transactions with process bottlenecks. As such, the computing server 130 may classify the plurality of transactions into a first group that includes transactions without being marked as having outliers and a second group that includes transactions being marked as having outliers.

The computing server 130 may determine the signatures of the transactions. For example, the computing server 130 may convert 930 the transactions into vectors such as word embeddings based on the features of the transactions. The computing server 130 may identify a transaction that has no outlier, such as a transaction that has the best KPI value (or that spends the least amount of time), as a reference transaction. The computing server 130 may compare the vectors representing other transactions to the vector representing the reference transaction. For example, the computing server 130 may use 940 cosine similarity between the vector representing a target transaction and the vector representing the reference transaction to determine the signature of the target transaction. The signatures of the first group of transactions and the signatures of the second group of transactions are determined. The computing server 130 may compute 950 the signature with no outlier and use it to represent an optimized process. The computing server 130 may construct 960 a process variant 250 based on the signature. Also, the computing server 130 may receive reinforcement 350 to further refine the results of generating the process variant 250. For example, transactions using any process variants 250 generated by the computing server 130 may be fed back to the process optimization stage 900 to refine the word embeddings and signatures of various transactions and to validate the results generated in this stage.

Example Post Processing

Figure 10:
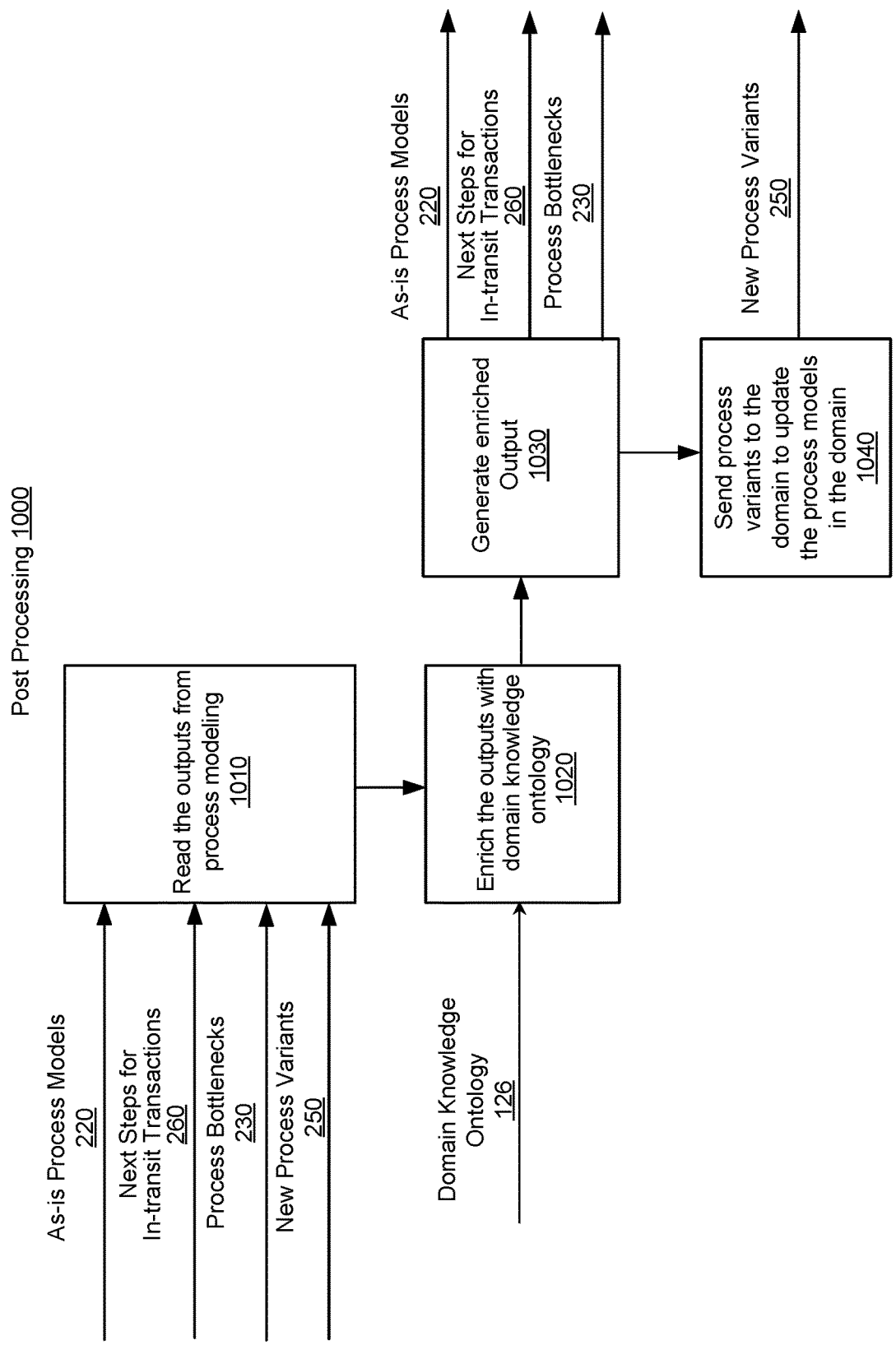
FIG. 10 is a block diagram illustrating an example post processing stage, in accordance with an embodiment.

FIG. 10 is a block diagram illustrating an example post processing stage 1000, in accordance with an embodiment. The computing server may perform post processing by reading 1010 the outputs from process modeling 500. The outputs may include as-is process models 220, next steps 260 for in-transit transactions, process bottlenecks 230, and new process variants 250. The computing server 130 may enrich 1020 each of the outputs with domain knowledge ontology 126. The domain knowledge ontology 126 may be used to resolve ambiguity in and supplement other information absent from the outputs. For example, a process model generated by the computing server 130 may be associated with an item to be shipped. The domain knowledge ontology 126 may specify certain rules and procedures in shipping the item. The information may be added to the process model. In another example, the domain knowledge ontology 126 may provide important information with respect to the process bottlenecks 230 identified. For example, the domain knowledge ontology 126 may point to the departments that are involved in the bottlenecks 230 or may identify procedures established by the domain 110 that might cause the bottlenecks 230.

The computing server 130 may generate 1030 the enriched outputs using domain knowledge ontology 126. Other ways to enrich the outputs are also possible. For example, an employee may generate manual labels or data to amend some of the outputs. In one case, the employee may examine the identified bottlenecks to determine whether bottlenecks are attributed to inefficiency or inherent complexity of the process step. The employee may manual label the bottlenecks and also may change the process models. The new process variants 250 may also be sent 1040 back to the domain 110 to update the process models 122 stored in the domain 110. The process metadata 124 may also be changed based on the update.

Computing Machine Architecture

Figure 11:
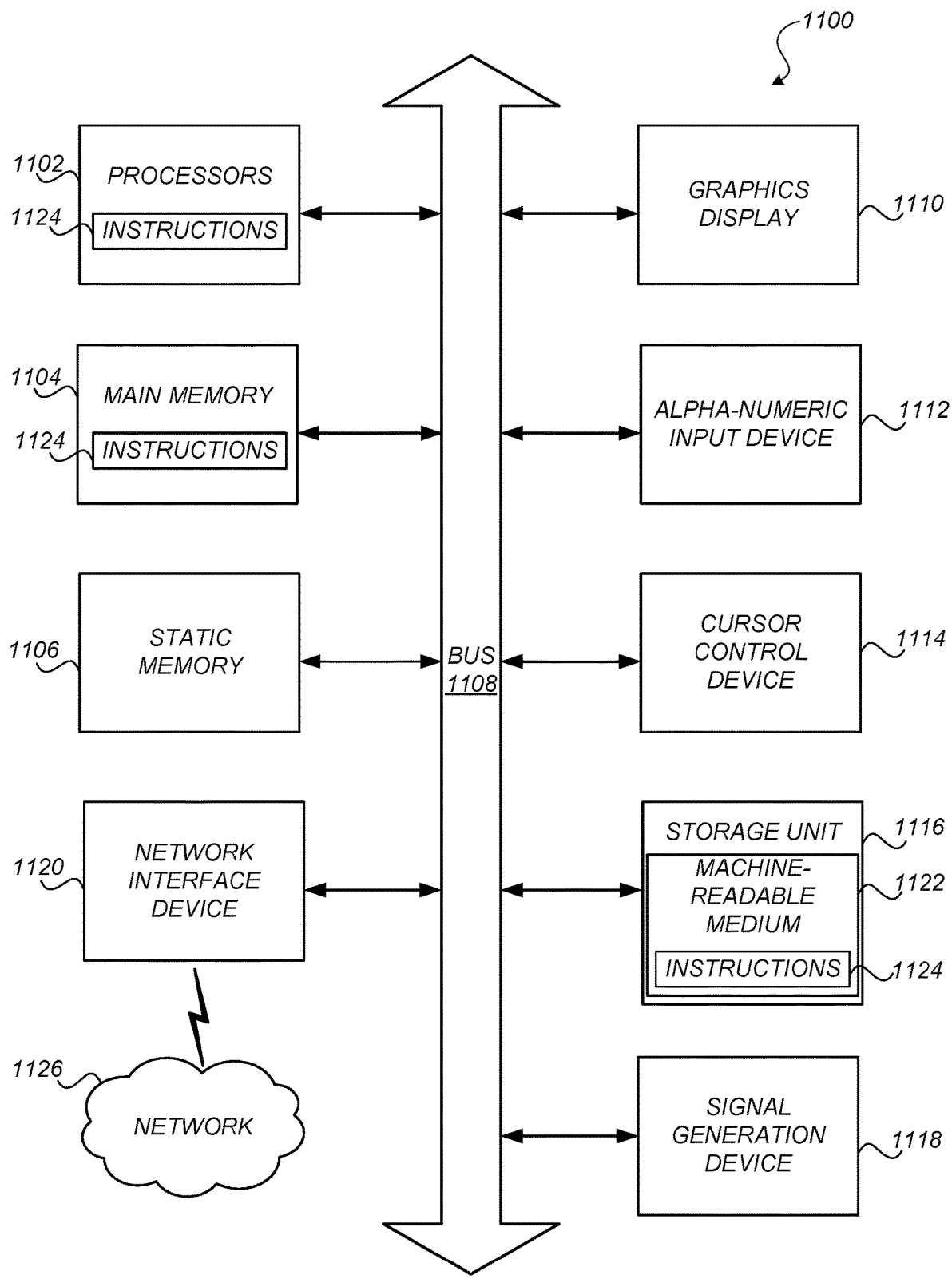
FIG. 11 is a block diagram illustrating components of an example computing machine, in accordance with an embodiment.

FIG. 11 is a block diagram illustrating components of an example computing machine that is capable of reading instructions from a computer-readable medium and execute them in a processor (or controller). A computer described herein may include a single computing machine shown in FIG. 11, a virtual machine, a distributed computing system that includes multiples nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIG. 1, including but not limited to, the domain 110, the computing server 130, and various engines, interfaces, terminals, and machines shown in FIG. 1. While FIG. 11 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1100 may also include a memory 1104 that store computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1102 and reduces the space required for the memory 1104. For example, the machine learning methods described herein reduces the complexity of the computation of the processors 1102 by applying one or more novel techniques that simplify the steps in training, reaching convergence, and generating results of the processors 1102. The algorithms described herein also reduces the size of the models and datasets to reduce the storage space requirement for memory 1104.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processors 1102, displays a graphical user interface (GUI) to display one or more results and data generated by the processes described herein. The computer system 1100 may also include alphanumeric input device 1112 (e.g., a keyboard), a cursor control device 1114 (e.g., a mouse, a trackball, a joystick, a motion sensor, or other pointing instrument), a storage unit 1116 (a hard drive, a solid state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, a computing server that extracts unstructured data of a domain to generate various process models may reduce the computing time of the domain in identifying a process and generating data structure related to unstructured data. The computing server achieves efficient and effective data and process management of the domain by extracting objects and connecting objects and events from various unstructured sources that are seemingly unrelated. This allows processes that are conventionally challenging to discover to be automatically and systematically identified and optimized. This also reduces the complexity of databases by allowing unstructured data to play a role in generating meaning processes and structured information, sometimes without the need of converting the text and documents in unstructured sources to structured databases.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
   receiving a master data schema of a domain and a transaction data schema of the domain;
   identifying named entities in unstructured data of the domain based on the master data schema and the transaction data schema, at least one of the identified named entity corresponding to values stored in the master data schema or the transaction data schema;
   identifying activities associated with the named entities, at least one of the identified activities extracted from the unstructured data;
   labeling the activities with timestamps to generate an activity time sequence that arranges labeled activities in accordance with the timestamps, the activity time sequence generated by:
     representing the named entities as vectors based on relationships among the named entities referenced in the unstructured data;
     inputting the activities with the timestamps that are associated with the vectors into a machine learning model; and
     generating, by the machine learning model, the activity time sequence;
   generating one or more event sequences related to a target process associated with the domain, at least one of the event sequences generated from the activity time sequence;
   combining the one or more of event sequences to generate a process model representing the target process, the process model comprising data representing a directed and branched graph, at least a branch in the graph corresponding to the at least one of the event sequences generated from the activity time sequence; and
   identifying a bottleneck in the target process based on the data representing the directed and branched graph.

2. The computer-implemented method of claim 1, further comprising:
augmenting the process model with domain knowledge ontology of the domain.

3. The computer-implemented method of claim 1, wherein the machine learning model is a long short term memory neural network.

4. The computer-implemented method of claim 1, wherein the plurality of event sequences are generated from the unstructured data, transaction data corresponding to the transaction data schema, and master data corresponding to the master data schema.

5. The computer-implemented method of claim 1, further comprising:
inputting a version of the process model into a recurrent neural network; and
generating, by the recurrent neural network, a predicted next step of the target process.

6. The computer-implemented method of claim 1, wherein identifying the bottleneck in the target process comprises:
classifying the process model into a plurality of steps;
determining an average time for the one of the steps based on time spent for transactions that belong to the target process;
identifying at least one transaction with the one of the steps associated with time spent that deviates from the average time for more than a threshold amount; and
marking the one of the steps of the identified at least one transaction as the bottleneck.

7. The computer-implemented method of claim 1, wherein identifying the bottleneck in the target process comprises:
receiving a performance index;
classifying the process model into a plurality of steps;
determining an average performance index value for one of the steps for transactions that belong to the target process;
identifying at least one transaction with the one of the steps associated with a performance index values that deviates from the average performance index for more than a threshold amount; and
marking the one of the steps of the identified at least one transaction as the bottleneck.

8. The computer-implemented method of claim 1, further comprising:
identifying a plurality of transactions that belong to the target process, a transaction including one or more events of the target process occurred;
classifying the plurality of transactions into a first group comprising transactions without being marked as having outliers and into a second group comprising transactions being marked as having outliers;
determining signatures of the first group; and
constructing a process variant based on the signatures of the first group.

9. The computer-implemented method of claim 8, wherein an outlier is identified by comparing a vector representing a transaction to a reference vector representing a reference transaction through cosine similarity.

10. The computer-implemented method of claim 1, further comprising:
generating a process variant from the process model;
receiving a manual input to correct the process variant; and
saving the process variant in the domain.

11. A system, comprising:
a domain storing a master data schema of the domain and a transaction data schema of the domain; and
a computing server comprising a memory and at least one processor, the memory comprising instructions executable by the at least one processor, the instructions, when executed, cause the at least one processor to:
receive the master data schema and the transaction data schema;
identify named entities in unstructured data of the domain based on the master data schema and the transaction data schema, at least one of the identified named entity corresponding to values stored in the master data schema or the transaction data schema;
identify activities associated with the named entities, at least one of the identified activities extracted from the unstructured data;
label the activities with timestamps to generate an activity time sequence that arranges labeled activities in accordance with the timestamps, the activity time sequence generated by:
representing the named entities as vectors based on relationships among the named entities referenced in the unstructured data;
inputting the activities with the timestamps that are associated with the vectors into a machine learning model; and
generating, by the machine learning model, the activity time sequence;
generate one or more event sequences related to a target process associated with the domain, at least one of the event sequences generated from the activity time sequence;
combine the one or more of event sequences to generate a process model representing the target process, the process model comprising data representing a directed and branched graph, at least a branch in the graph corresponding to the at least one of the event sequences generated from the activity time sequence; and
identify a bottleneck in the target process based on the data representing the directed and branched graph.

12. The system of claim 11, wherein the instructions, when executed, further cause the at least one processor to:
augment the process model with domain knowledge ontology of the domain.

13. The system of claim 11, wherein the plurality of event sequences are generated from the unstructured data, transaction data corresponding to the transaction data schema, and master data corresponding to the master data schema.

14. The system of claim 11, wherein the instructions that cause the at least one processor to identify the bottleneck in the target process comprises instructions to:
receive a performance index;
classify the process model into a plurality of steps;
determine an average performance index value for one of the steps for transactions that belong to the target process;
identify at least one transaction with the one of the steps associated with a performance index values that deviates from the average performance index for more than a threshold amount; and
mark the one of the steps of the identified at least one transaction as the bottleneck.

15. The system of claim 11, wherein the instructions, when executed, further cause the at least one processor to:

identify a plurality of transactions that belong to the target process, a transaction including one or more events of the target process occurred;

classify the plurality of transactions into a first group comprising transactions without being marked as having outliers and into a second group comprising transactions being marked as having outliers;

determine signatures of the first group; and construct a process variant based on the signatures of the first group.

16. The system of claim 15, wherein an outlier is identified by comparing a vector representing a transaction to a reference vector representing a reference transaction through cosine similarity.

17. A non-transitory computer readable medium for storing computer code comprising instructions, when executed by at least one processor, cause the at least one processor to:

receive a master data schema of a domain and a transaction data schema of the domain;

identify named entities in unstructured data of the domain based on the master data schema and the transaction data schema, at least one of the identified named entity corresponding to values stored in the master data schema or the transaction data schema;

identify activities associated with the named entities, at least one of the identified activities extracted from the unstructured data;

label the activities with timestamps to generate an activity time sequence that arranges labeled activities in accordance with the timestamps, the activity time sequence generated by:

representing the named entities as vectors based on relationships among the named entities referenced in the unstructured data;

inputting the activities with the timestamps that are associated with the vectors into a machine learning model; and generating, by the machine learning model, the activity time sequence;

generate one or more event sequences related to a target process associated with the domain, at least one of the event sequences generated from the activity time sequence;

combine the one or more event sequences to generate a process model representing the target process, the process model comprising data representing a directed and branched graph, at least a branch in the graph corresponding to the at least one of the event sequences generated from the activity time sequence; and identify a bottleneck in the target process based on the data representing the directed and branched graph.

18. The non-transitory computer readable medium of claim 17, wherein the instructions that cause the at least one processor to identify the bottleneck in the target process comprises instructions to:

receive a performance index;

classify the process model into a plurality of steps;

determine an average performance index value for one of the steps for transactions that belong to the target process;

identify at least one transaction with the one of the steps associated with a performance index values that deviates from the average performance index for more than a threshold amount; and mark the one of the steps of the identified at least one transaction as the bottleneck.

* * * * *